Aug. 13, 1963   R. E. KOSIN ETAL   3,100,377
DEFLECTING MEANS FOR JET AIRCRAFT AND THE LIKE
Filed Nov. 14, 1960   3 Sheets-Sheet 1
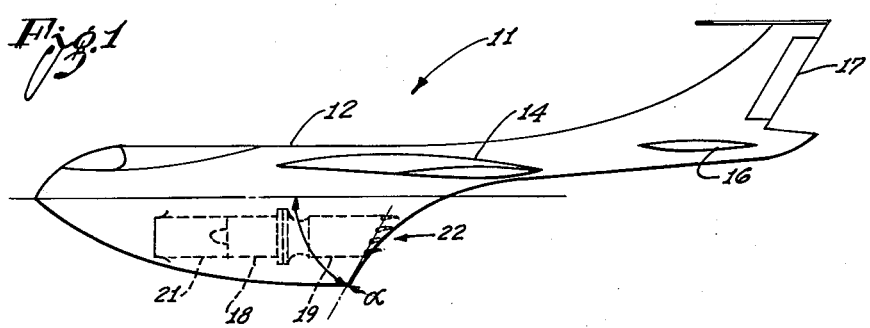
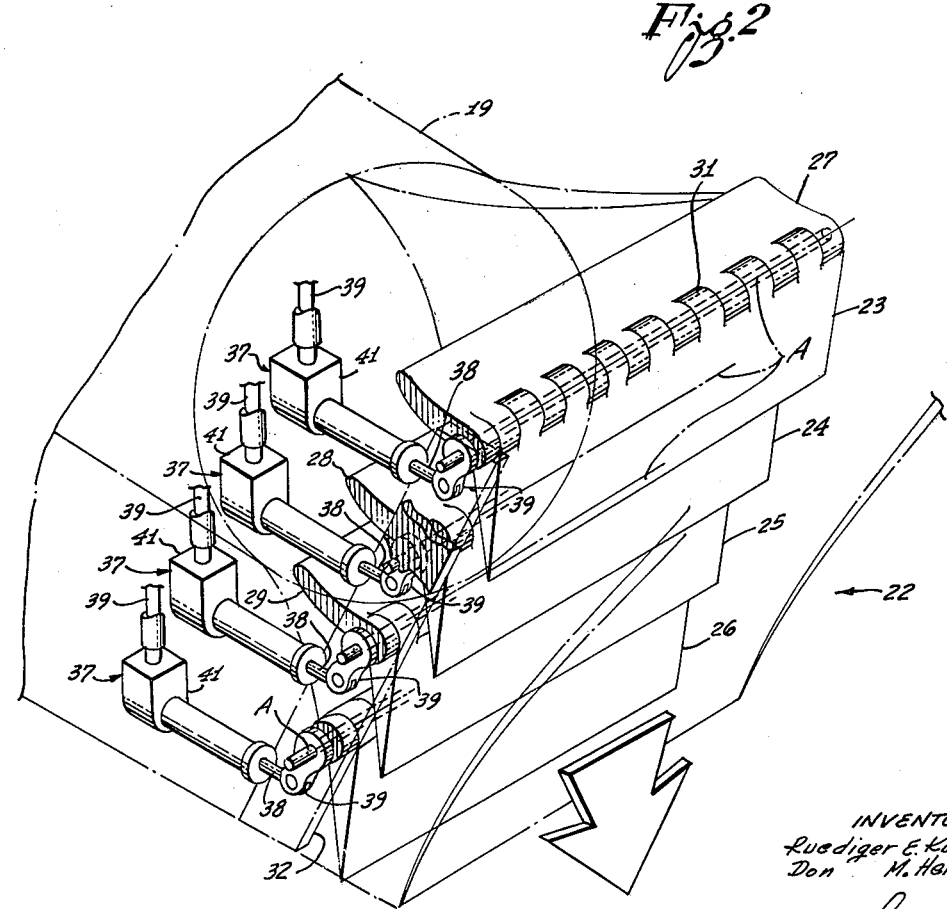
INVENTORS:
Ruediger E. Kosin
Don M. Heinze
By Willard M. Graham
Agent.

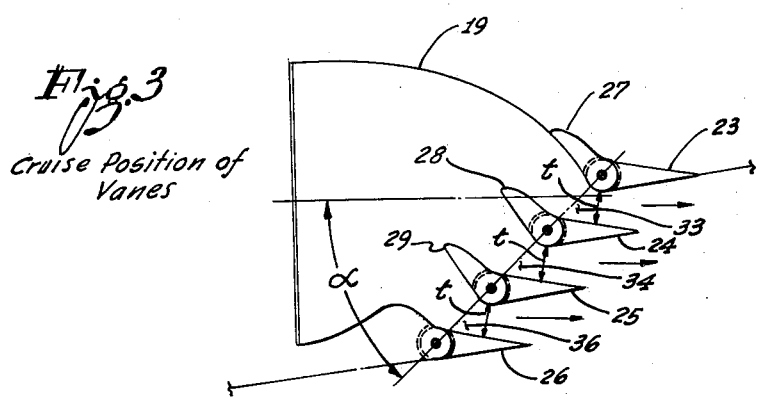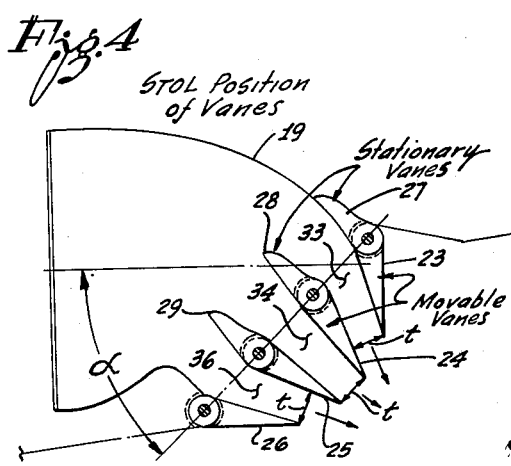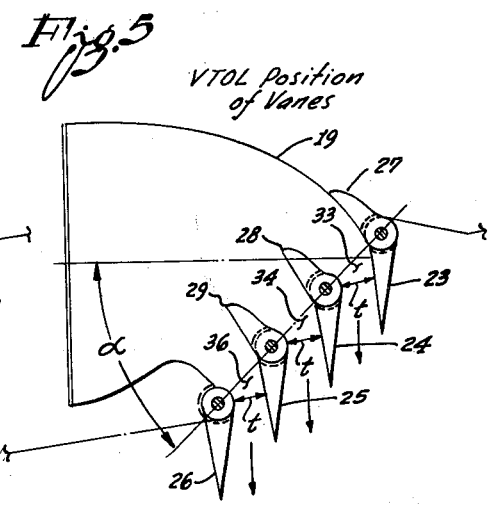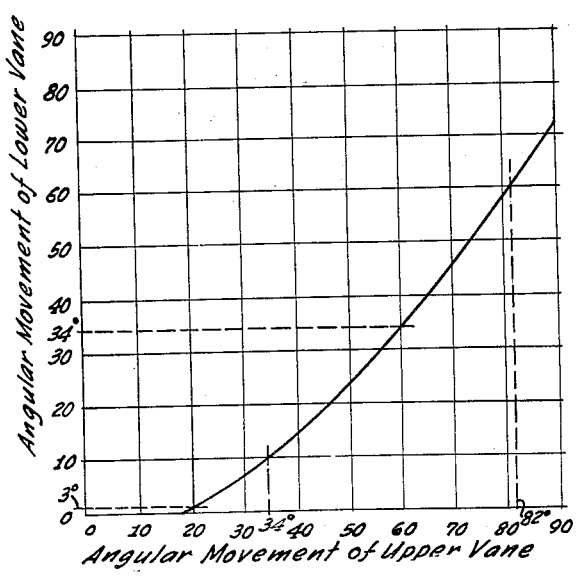

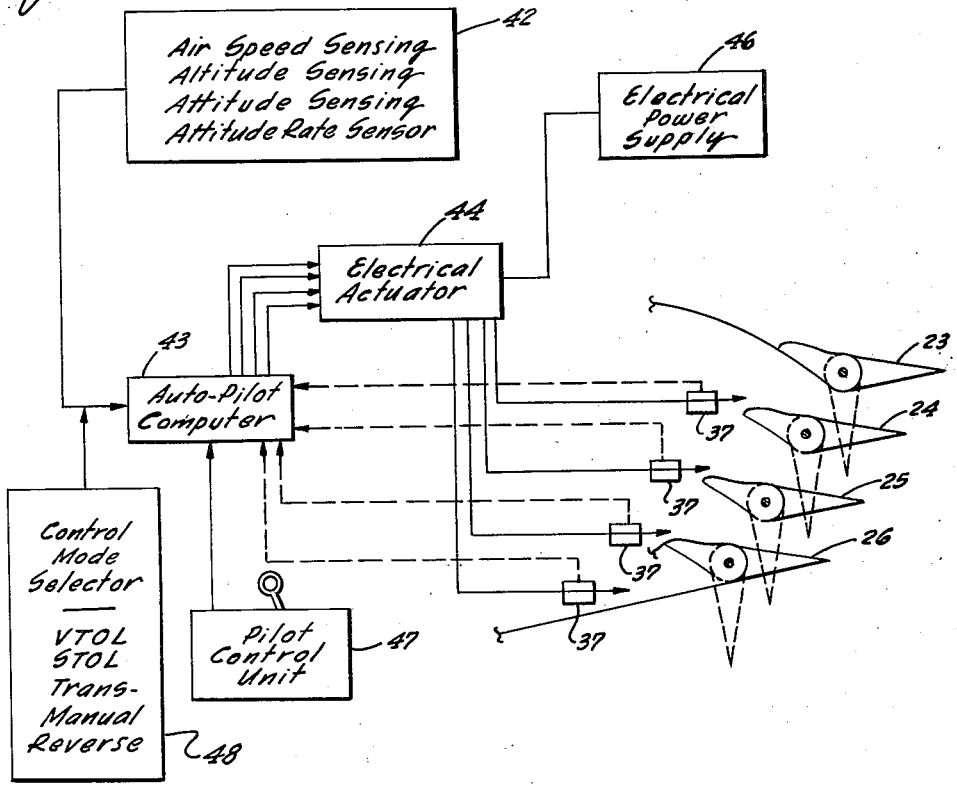

3,100,377
DEFLECTING MEANS FOR JET AIRCRAFT
AND THE LIKE
Ruediger E. Kosin, Palos Verdes Estates, and Don M. Heinze, Los Angeles, Calif., assignors to Northrop Corporation, Beverly Hills, Calif., a corporation of California
Filed Nov. 14, 1960, Ser. No. 69,211
2 Claims. (Cl. 60—35.54)

This invention relates to improvements in jet type aircraft and more particularly to aircraft of the above type embodying a thrust vectoring device enabling the aircraft to effect VTOL/STOL as well as normal take-off and landings.

Numerous types of aircraft have been proposed embodying features enabling the aircraft to effect VTOL, STOL and conventional take-off and landings. Also these features enable the aircraft to effect a transition between VTOL or STOL operations and conventional flight operations. To the best of applicants' knowledge all such aircraft designed to provide the above capabilities have been unwieldy, heavy, costly and generally inefficient in their operation and, therefore, have left much to be desired.

The terms "VTOL" and "STOL" as used throughout this specification refer to aircraft having vertical take-off and landing and short take-off and landing capabilities, respectively.

Accordingly it is an object of the present invention to provide a jet type aircraft having subsonic and supersonic cruise capabilities and embodying a thrust vectoring device which enables the aircraft to effect VTOL, STOL and normal take-off and landing operations.

Another object is to provide a jet type aircraft having subsonic and supersonic cruise capabilities and embodying a thrust vectoring device for deflecting and controlling the expansion of the engine's exhaust gas in an efficient and effective manner throughout all operating ranges of the deflecting means and engine.

Another object is to provide a jet type aircraft having subsonic and supersonic cruise capabilities and embodying a thrust vectoring device adapted to divert the engine's exhaust gases in a horizontal or near horizontal direction while the engine is accelerated to full speed and need only be deflected to the vertical direction momentarily for take-off thus minimizing ground erosion and landing gear heating problems.

Another object is to provide a jet type aircraft having subsonic and supersonic cruise capabilities and embodying a thrust vectoring device which is simple in design yet rugged in construction, economical to manufacture and is easily adapted to most aircraft.

Although the characteristic features of the present invention are particularly pointed out in the appended claims, the invention itself, also the manner in which it may be carried out, will be better understood by referring to the following description taken in connection with the accompanying drawings forming a part of this application and in which:

FIGURE 1 is a side view of an aircraft embodying a jet type engine and exhaust gas deflector means of the type disclosed herein.

FIGURE 2 is an isometric view on an enlarged scale showing the vanes comprising the exhaust gas deflector means of FIGURE 1 in their VTOL positions.

FIGURES 3, 4 and 5 are schematic side views showing the arrangement of the vanes comprising the exhaust deflector means of FIGURE 2 in their cruise or initial, STOL or intermediate and VITOL or terminal positions, respectively.

FIGURE 6 constitutes a graph showing the relative movement of one vane of the deflector means shown in FIGURE 2 with respect to other vanes of the deflector.

FIGURE 7 is a schematic view showing a control system for controlling and actuating the exhaust gas deflector means as shown in FIGURE 2.

Referring to the drawings, FIGURE 1 shows a jet propelled aircraft 11 having a fuselage 12, wings 14, horizontal tail surfaces 16 and a vertical fin 17. Propulsion for the airplane is provided by a turbine type engine 18 having a tail pipe 19 through which the engine exhausts at a location near the longitudinal center of the aircraft 11. Air enters the engine 18 through a pair of intake ducts 21 (only one of which is shown in FIGURE 1) located respectively on each side of the fuselage 12. In the embodiment shown the deflector means 22 is mounted in the tail pipe 19 at a position approximately vertically below the center of gravity of the aircraft 11. Although only one deflector means 22 is shown in FIGURE 1, it should be understood that more than one deflector means may be utilized and their locations made compatible with the type of engine, ducting, etc. utilized in the aircraft 11.

Details of the gas deflector means 22 as best seen in FIGURE 2 includes a plurality of movable vanes 23–26, inclusive, and a plurality of stationary vanes 27, 28 and 29. The movable vanes 23–26 are wedge shaped in cross-section while the stationary vanes 27–29 have a stream-lined configuration. The movable and stationary vanes are joined together by piano hinge-like means 31 allowing relative movement therebetween while the movable vanes are mounted for pivotal movement in rack members 32—32 (only one of the rack members 32 being shown in FIGURE 2) for pivotal movement through respective angular ranges as presently explained. Angular movement is imparted to the vanes 23–26 by individual screw jack assemblies 37 or the like which are actuated by a control system to be presently described.

The deflector means 22 is located at the aft end of the tail pipe 19 at which point the tail pipe changes from a circular to a rectangular cross-section. The vanes 23–26 pivot about axis A which have a parallel relation and constitute the axis of the piano hinge means 31. The vanes 23 and 26 are mounted adjacent and have a parallel relation with respect to the top and bottom edges, respectively, of the pipe 19; the blades 24 and 25 are in turn equally spaced between and have a parallel relation with respect to the vanes 23 and 26 to provide thru passages or nozzles 33, 34, and 36 for the engine's exhaust gases as best seen in FIGURES 3, 4 and 5.

The members 32—32 have an angular relation with respect to the longitudinal axes of the aircraft 11 and tail pipe 19 as indicated by the Greek letter α in FIGURES 1, 3, 4 and 5. The angle α is hereinafter referred to as the rack angle of the deflector means 22. The angle α should always be an acute angle for reasons which will become apparent as the disclosure progresses, however, it may vary considerably in accordance with specific design requirements. In the embodiment shown the angle α constitutes an acute angle of approximately forty-five degrees (45°). Accordingly it will be seen that the rack angle α of the deflector means, that is, the angle included between a plane extending through and containing the pivotal axis "A" of the vanes 23–26 and the longitudinal axes of the aircraft 11, will have the same angular relation with respect to the longitudinal axes of the aircraft as the members 32—32. A different number of deflector vanes than the number shown in the various figures may be utilized, the only limitation being that the vanes should be positioned and have the same relationships as that described in connection with the vanes 23–26.

The movable vanes 23–26 are of identical configuration and are characterized in that they are wedge shaped in cross-section. The fixed vanes 27, 28 and 29 are of streamlined configuration and are positioned so that they provide a slightly convergent nozzle in an aft direction as best seen in FIGURES 3, 4 and 5.

Pivotal movement is imparted to the vanes 23–26 by the aforementioned screw jacks 37. The output members 38 of the jack assemblies 37 are pivotally connected to the bifurcated ends of crank members 39. The inner ends of the crank members 39 are secured to shafts which in turn are fixedly secured to and rotate with the vanes 23–26. The axes of the shafts referred to above coincide with and in fact constitutes the axes "A" of the vanes 23–26. Rotational movement is imparted to the jack assemblies 37 by means of flexible shafts 39 or the like; this rotational movement is in turn converted into linear movement by suitable gear means 41 comprising an integral part of the assemblies 37. Thus it will be seen that pivotal movement in either a clockwise or counter-clockwise direction is imparted to the vanes 23–26 according to the amount and direction of rotation of the shafts 39.

The gas deflector means 22 enables the aircraft 11 to take-off, land and cruise in a conventional manner, take-off and land vertically and also to effect short take-off and landing operations. During normal take-off and landing operations, also during cruise operations of the aircraft 11, the movable vanes 23–26 are positioned substantially aft of their respective pivotal axes "A" substantially as shown in FIGURE 3. This position of the vanes 23–26 (FIGURE 3) constitutes the normal cruise or initial position thereof and as positioned coact with each other and with the fixed vanes 27–29 to define convergent-divergent nozzles 33, 34 and 36 having a cascade-like relation. It will also be noted, when the vanes 23–26 are positioned in their cruise position, that the vanes 23–26 divert the engine's exhaust gases in a substantially true aft direction with respect to the aircraft 11.

The vanes 23–26, when rotated in a clockwise direction through an angle of approximately ninety degrees (90°), are caused to assume their VTOL or terminal position (FIGURE 5) in which the exhaust blast is deflected at an angle of approximately ninety degrees (90°) with respect to the longitudinal axes of the aircraft 11.

At a position located between the cruise and VTOL positions of the vanes 23–26 they assume a position referred to as their STOL or intermediate position (FIGURE 4) enabling the aircraft 11 to effect short take-off and landing operations. In this position the fixed and movable vanes cooperate to define convergent nozzles and the engine's exhaust gases are deflected downwardly at a suitable angle with respect to the longitudinal axes of the aircraft 11.

Rotational movement is imparted to the vanes 23–26 so that the throat dimensions "t" of the nozzles 33, 34 and 36 are maintained constant as shown in FIGURES 3, 4 and 5. For reasons which are well known in the art it is essential that the throat dimensions "t" be maintained constant as the vanes 23–26 are moved through their respective angular ranges in order that the jet engine 18 will function at maximum efficiency throughout its complete operating range. By maintaining the throat dimension constant the cross-sectional areas of the nozzles 33, 34 and 36 are also maintained constant.

In actual practice differential angular movement of the vanes 23–26 is determined as follows. With the vanes 23–26 in their cruise positions (FIGURE 3) angular movement is first imparted to the uppermost vane 23 until its lower surface is parallel with the top surface of the vane 24. Thus it will be seen that the distance "t" is constant throughout the extent of the vanes 23 and 24. To maintain this dimension "t" constant it will now be apparent that differential angular movement must now be imparted to the vanes 23 and 24. At such time as the lower surface of the vane 24 is caused to assume a parallel relation with respect to the upper surface of the vane 25 angular movement necessary to maintain the throat dimension "t" constant is now imparted to the vane 25. Movement of the vane 26 with respect to the vane 25 is determined in the manner just described. During the time that differential angular movement is being imparted to the vanes 23–26, that is except at such time as the movement of the vanes 23–26 is represented by the straight-line portion of the curve of FIGURE 6 and at locations immediately adjacent their cruise positions, the movable vanes 23–26 and the fixed vanes 27, 28 and 29 cooperate to define convergent nozzles which is the most efficient nozzle for sub-sonic speeds.

For the specific embodiment shown relative angular movement of the vanes 23–26 may be seen by referring to the graph shown in FIGURE 6. By referring to this graph it will be seen that the uppermost vane 23 will move from its cruise position (FIGURE 3) through an angle of approximately 17° before any movement is imparted to the vane 24. The same relation prevails in connection with the vane 24 with respect to the vane 25 and the vane 25 with respect to the vane 26, in other words the vane 23 will move through an angle of 51° before any movement is imparted to the vane 26. A more complete understanding of the relative movement of the vanes 23–26 may be forthcoming by referring to the graph of FIGURE 6 and assuming that the uppermost vane 23 has been moved (in a clockwise direction) through an angle of 82°. By using the angular movement of the vane 23 as an abscissa it will be seen the corresponding ordinate equals 60 or in other words the vane 24 has now moved through an angle of 60°, utilizing 60 as an abscissa it will be seen the vane 25 has moved through an angle of 34° and finally utilizing 34 as an abscissa it will be seen that the vane 26 has moved through an angle of 10°. Further, by referring to FIGURE 4, it will be seen that prior to the time the vanes 23–26 are caused to assume their STOL positions they cooperate with the fixed vanes 27, 28 and 29 to define convergent nozzles. The fixed and movable vanes continue to define convergent nozzles as the movable vanes 23–26 are angularly moved through practically the remainder of their ranges or until the vane 23 is rotated through 90° or in other words reaches the straight line portion of the curve shown in FIGURE 6. The straight line portion of the curve (FIGURE 6) indicates that the uppermost vane has reached its 90° or VTOL position while the lower vanes will continue to move until all vanes are caused to assume their VTOL positions as shown in FIGURE 5.

The control means schematically shown in FIGURE 7 comprises means for controlling movements of the respective vanes of the deflector means 22. The control means constitutes conventional components and represent one of several systems which may be utilized to control the aforementioned differential angular movement of the vanes 23–26. Briefly the system includes a device or devices 42 for sensing the air speed, altitude, attitude and rate of change in the attitude of the aircraft 11. Signals from the device 42 are fed to a summation computer, for example an autopilot computer identified by the numeral 43. Command signals from the computer 43 are in turn fed to an electrical actuator 44 and corresponding mechanical movements are transmitted by suitable mechanical linkage, i.e., the screw jack assemblies 37 of FIGURE 2, to the vanes 23–26. Feed back signals, shown by broken line construction in FIGURE 6, are returned to the computer 43 from the jacks 37 indicating the instantaneous positions of the vanes 23–26. Considering the aforementioned differential movement of the vane 23 with respect to the vane 24, command signals of greater duration are forwarded to the means controlling the movement of the vane 23 than to the means controlling the movement of the vane 24 at such times as the vanes are in the initial portion of their angular ranges. Also, the computer 43 functions to provide signals of greater duration to the means controlling the movement of the vane 24 than the vane 23 during the terminal portion of their angular range. Similar differential movements as described above in connection with the vanes 23 and 24 are also imparted to the vane 24 with respect to the vane 25, and the vane 25 with respect to the vane 26. Upon proper movement of the vanes 23–26, the feed back signals cancel the command signals and further command signals are not transmitted to the actuator 44 and further movements of the vanes 23–26 are precluded until different signals are again fed to the computer 43 or the air speed, altitude, attitude, etc. of the aircraft 11 changes. Power for the actuator 44 is provided by an electrical power source 46.

The sensing device 42 and signals received therefrom constitute an automatic control system, however, signals originating with the sensing means 42 may be overridden by a pilot actuated control device 47 or by a semiautomatic mode selector 48. Accordingly the pilot of the aircraft 11 may position the vanes 23–26 as desired or by utilizing the selector 48 the vanes may be positioned in their VTOL, STOL or cruise position automatically. The selector 48 may constitute conventional play back equipment of any conventional type.

It will be seen that the vanes of the deflector means 22 as disclosed herein define convergent-divergent nozzles at such times as the vanes are in their cruise and VTOL positions and convergent nozzles at such times as the vanes are actuated throughout the remainder of their ranges. Inasmuch as the deflector means 22 was designed to function only with an aircraft having on the most part subsonic capabilities, the fact that the movable vanes 23–26 and fixed vanes 27, 28 and 29 cooperate to define convergent-divergent nozzles during cruise and VTOL operations is not objectional.

Any suitable type of conventional reaction devices may be utilized to maintain the stability of the aircraft 11 during VTOL operations. Such devices are well known and may be located adjacent the nose and tail of the aircraft and on each of the wings 14.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

We claim:

1. A deflector assembly for controlling and deflecting the exhaust gases from an aircraft jet engine comprising: an elongated duct adapted to convey the exhaust gases from said engine; said duct having fore and aft ends providing means for the ingress and egress, respectively, of the exhaust gases and an axis extending parallel to the longitudinal extent of said duct; a plurality of fixed vanes that are generally wedge-shaped in cross-section; said fixed vanes being mounted as a cascade in horizontal and vertical spaced relation at the aft end of said duct with the blunt edges thereof having a downstream relation with respect to exhaust gases flowing through said duct; a plurality of individual movable vanes; said movable vanes being wedge-shaped in cross-section; a movable vane being attached to each of said fixed vanes with the blunt edges of said movable vanes being in contacting relation with the blunt edges of said fixed vanes; and means adapted to simultaneously pivotally move said movable vanes in the same direction at differential speeds through an angular range between initial and final positions in which the latter vanes cooperate with said fixed vanes to define convergent-divergent nozzles at such time as said movable vanes are located in said initial and final positions and positions immediately adjacent thereto and convergent nozzles at such time as said movable vanes are located in other positions throughout said angular range.

2. Apparatus as set forth in claim 1: in which said movable vanes are attached to said fixed vanes in piano hingelike relation whereby said fixed and movable vanes define a plurality of continuous vanes that are generally diamond-shaped in cross-section.

References Cited in the file of this patent

UNITED STATES PATENTS

| 2,799,989 | Kappus | July 23, 1957 |
| 2,973,921 | Price | Mar. 7, 1961 |

FOREIGN PATENTS

| 764,180 | Great Britain | Dec. 19, 1956 |